United States Patent
James et al.

(10) Patent No.: US 10,154,367 B2
(45) Date of Patent: Dec. 11, 2018

(54) ADAPTIVE THRESHOLD FOR PROXIMITY BASED WIRELESS COMMUNICATIONS FEATURES

(71) Applicant: Google Inc., Mountain View, CA (US)

(72) Inventors: Bryan James, Menlo Park, CA (US); Laura Rabb, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/596,797

(22) Filed: May 16, 2017

(65) Prior Publication Data

US 2017/0332190 A1    Nov. 16, 2017

Related U.S. Application Data

(60) Provisional application No. 62/337,314, filed on May 16, 2016.

(51) Int. Cl.
| | | |
|---|---|---|
| *H04B 17/21* | (2015.01) | |
| *H04W 24/02* | (2009.01) | |
| *H04W 4/00* | (2018.01) | |
| *H04B 17/318* | (2015.01) | |
| *H04L 12/26* | (2006.01) | |

(Continued)

(52) U.S. Cl.
CPC .......... *H04W 4/008* (2013.01); *H04B 17/318* (2015.01); *H04L 43/16* (2013.01); *H04W 4/80* (2018.02); *H04W 76/14* (2018.02)

(58) Field of Classification Search
CPC ....... H04W 4/00; H04W 4/008; H04W 48/16; H04W 76/02; H04W 24/02; H04W 76/10; H04B 17/00; H04B 17/21; H04B 17/23; H04B 17/318
See application file for complete search history.

(56) References Cited

U.S. PATENT DOCUMENTS

| | | | |
|---|---|---|---|
| 9,753,562 B2 * | 9/2017 | Reunamaki | ............ G06F 3/041 |
| 9,860,297 B2 * | 1/2018 | Palin | ..................... H04W 4/029 |
| 2006/0056356 A1 | 3/2006 | Arvelo | |

(Continued)

FOREIGN PATENT DOCUMENTS

WO    WO-2014190552 A1    12/2014

*Primary Examiner* — Blane Jackson
(74) *Attorney, Agent, or Firm* — Morris & Kamlay LLP

(57) ABSTRACT

A method of improving wireless communication of an apparatus includes detecting a wireless signal from a wireless communication device at a first signal strength level, detecting the wireless signal increasing from the first strength level to exceed a threshold level associated with the wireless communication device, requesting, by the apparatus, an input from a user of the apparatus when the signal strength exceeds a threshold level associated with the wireless communication device, wherein the input indicates whether the apparatus should cause an action to occur at the wireless communication device, adjusting, at the apparatus, the threshold level associated with the wireless communication device after receiving the input, and automatically transmitting a signal from the apparatus to the wireless communication device to cause the wireless communication device to perform the action when the apparatus detects the wireless signal from the wireless communication device has exceeded the adjusted threshold level.

24 Claims, 3 Drawing Sheets

(51) Int. Cl.
  *H04W 4/80* (2018.01)
  *H04W 76/14* (2018.01)

(56) References Cited

U.S. PATENT DOCUMENTS

| | | |
|---|---|---|
| 2006/0128308 A1 | 6/2006 | Michael |
| 2006/0199534 A1 | 9/2006 | Smith |
| 2011/0053523 A1* | 3/2011 | Yeh ......................... H04B 1/406 |
| | | 455/73 |
| 2012/0258669 A1 | 10/2012 | Honkanen |
| 2014/0194062 A1* | 7/2014 | Palin .................... H04W 4/008 |
| | | 455/41.2 |
| 2014/0378056 A1 | 12/2014 | Liu |
| 2015/0289082 A1 | 10/2015 | Salokannel |
| 2015/0341804 A1 | 11/2015 | Syrjarinne |
| 2015/0373749 A1* | 12/2015 | Palin .................... H04W 76/02 |
| | | 455/41.2 |
| 2016/0183317 A1* | 6/2016 | Shao ................... H04W 76/023 |
| | | 709/227 |
| 2016/0381641 A1 | 12/2016 | Shahar |
| 2017/0280277 A1* | 9/2017 | Ge .......................... H04W 4/00 |

* cited by examiner

ADAPTIVE THRESHOLD FOR PROXIMITY BASED WIRELESS COMMUNICATIONS FEATURES

BACKGROUND

Radio frequency (RF) transmission protocols such as Bluetooth® (BT) and Bluetooth Low Energy® (BLE) have achieved widespread adaptation as wireless standards. For example, BT is often used to transport audio signals. BLE is used to transport short pieces of information, for example, signals carrying limited data that may be used for tracking or determining a location of an item with respect to another item.

BRIEF SUMMARY

According to an embodiment of the disclosed subject matter, a method of improving wireless communication of an apparatus includes receiving, at the apparatus, an initiation request from a user, detecting, at the apparatus, in response to the request, a signal strength of a signal from a wireless communication device, the signal broadcasting in a wireless communication standard, requesting the user to place the apparatus in a first disposition in which the detected signal strength exceeds a default threshold level associated with the wireless communication device and to confirm communication between the apparatus and the wireless communication device, requesting the user to place the apparatus in a second disposition different from the first disposition in which the detected signal strength is less than the default threshold level associated with the wireless communication device and confirm communication between the apparatus and the wireless communication device, adjusting, at the apparatus, the threshold level associated with the wireless communication device based on the signal strength detected when the user confirmation is received by the apparatus, and automatically transmitting a signal from the apparatus to the wireless communication device to cause the wireless communication device to perform an action when the apparatus detects that the signal strength from the wireless communication device has exceeded the adjusted threshold level.

According to an embodiment of the disclosed subject matter, a method of improving a wireless communication of an apparatus, includes detecting, at the apparatus, a wireless signal from a wireless communication device at a first signal strength level, detecting, at the apparatus, the wireless signal increasing from the first strength level to exceed a threshold level associated with the wireless communication device, requesting, by the apparatus, an input from a user of the apparatus when the signal strength exceeds a threshold level associated with the wireless communication device, wherein the input indicates whether the apparatus should cause an action to occur at the wireless communication device, adjusting, at the apparatus, the threshold level associated with the wireless communication device after receiving the input, and automatically transmitting a signal from the apparatus to the wireless communication device to cause the wireless communication device to perform the action when the apparatus detects the wireless signal from the wireless communication device has exceeded the adjusted threshold level.

Means for receiving, at an apparatus, an initiation request from a user, detecting, at the apparatus, in response to the request, a signal strength of a signal from a wireless communication device, the signal broadcasting in a wireless communication standard, requesting the user to place the apparatus in a first disposition in which the detected signal strength exceeds a default threshold level associated with the wireless communication device and to confirm communication between the apparatus and the wireless communication device, requesting the user to place the apparatus in a second disposition different from the first disposition in which the detected signal strength is less than the default threshold level associated with the wireless communication device and confirm communication between the apparatus and the wireless communication device, adjusting, at the apparatus, the threshold level associated with the wireless communication device based on the signal strength detected when the user confirmation is received by the apparatus, and automatically transmitting a signal from the apparatus to the wireless communication device to cause the wireless communication device to perform an action when the apparatus detects that the signal strength from the wireless communication device has exceeded the adjusted threshold level are disclosed.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
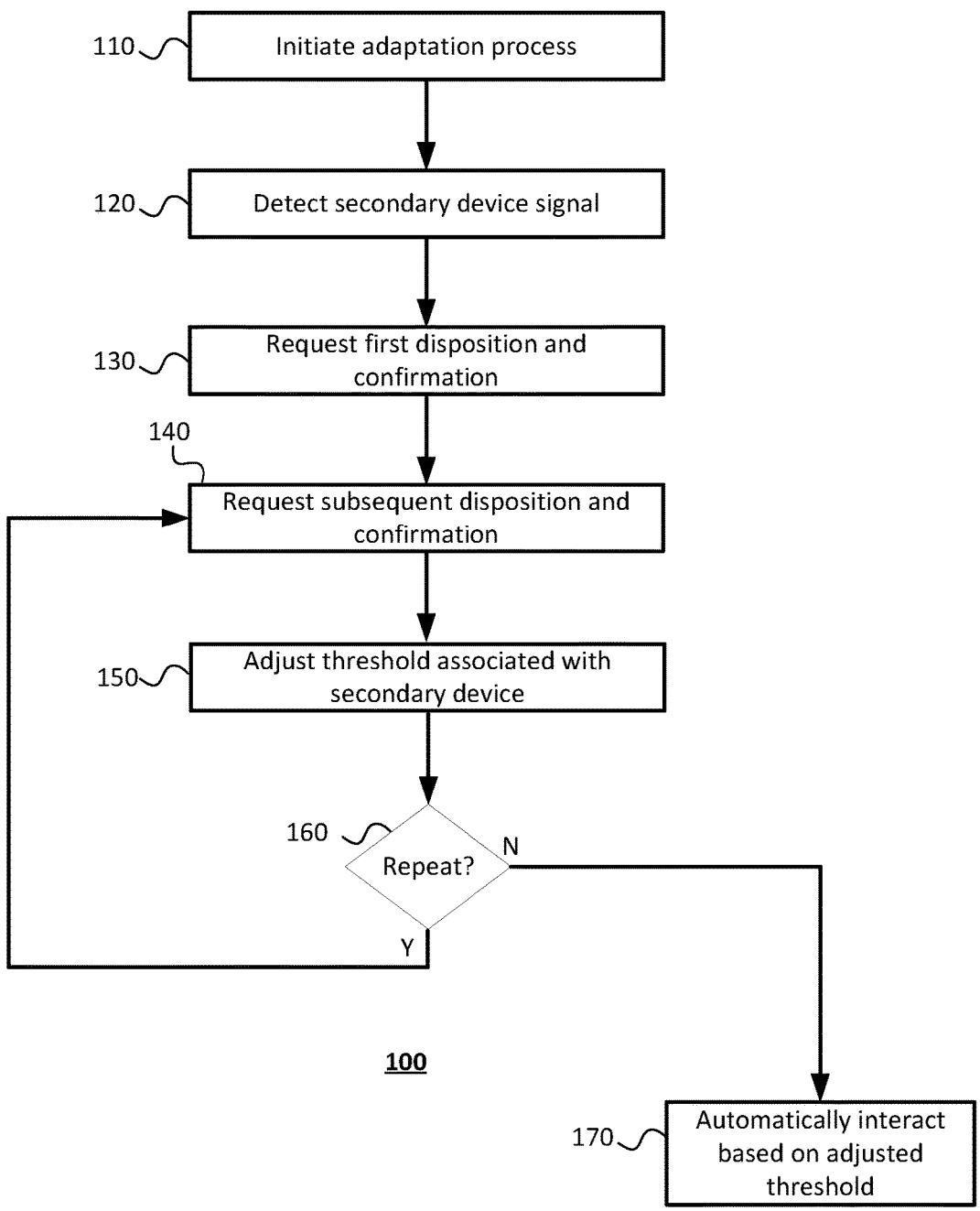
FIG. 1 shows a threshold adaptation process according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

The nature of RF transmissions can pose challenges to presenting a consistent user experience for various wireless features across devices and users. Signal strength as detected between two devices can be impacted by various factors, including device model and form factor, the presence of a protective case or attached power pack, presence of interference devices, or a positioning of a user's body in relation to a device's transmitter and receiver. The disclosed embodiments present a method and system to determine an adapted threshold parameter that can provide a consistent user experience, even across a multitude of different environments and scenarios.

An example application of the disclosed subject matter using BLE will now be provided, however, it should be understood that the disclosed subject matter is not limited to a particular application of BT/BLE features and can be applied to other types of wireless communications and other types of BT/BLE based features that are not specifically discussed here.

The concept of "leashing" or maintaining an "electronic leash" involves pairing one or more wireless communication devices (e.g., tags, beacons, peripherals, etc., referred to herein as "secondary devices") to a client device (e.g., a cellphone, tablet, mobile computing device, etc.). Pairing allows the client device and the secondary device to engage in secure, low-power communications through which the client device can, for example, exchange data, transmit commands, or determine an approximate location of the secondary device. In one use case, the secondary device can be a tag that is placed on an item to be tracked. For a first user, a maximum tracking distance between his/her client device and a tagged item may be six feet. That is, at a distance of six feet a signal strength from the tag to the client device decreases below a threshold value, at which the client device determines that the tag is out of range.

However, for a second user who purchased the same model device, the tracking feature may extend only up to a distance of two feet using the same threshold because in the signal is attenuated by a protective case attached to the second user's client device. This variance can be unexpected by the users and cause proximity based BT or BLE interactions to be less reliable and less attractive to users for whom consistent behavior is important.

In another example, a peripheral device can have an advertised response range of X meters. The peripheral device can define a default signal strength threshold for communication. The default value can be set by the manufacturer. However, the manufacturer may have determined the default value under optimal conditions that do not match the actual conditions that the peripheral device encounters when installed by a customer. The environment and inference conditions can vary from customer to customer, leading to different actual response ranges and inconsistent performance of the peripheral device across customers.

A threshold adaptation as disclosed herein can mitigate and significantly reduce inconsistent wireless communication results. By implementing the disclosed threshold adaptation, the threshold for proximity based wireless interactions can be adapted to better match a particular user's device, environment, interference patterns, or other situations.

Many wireless communications applications and protocols include a default threshold signal strength between a client device and a secondary device. In some cases, communications will not take place unless or until the signal strength exceeds the default threshold, even though communications at lower signal strengths may be possible.

FIG. 1 shows a threshold adaptation process 100 for a BT/BLE service according to a disclosed embodiment. At operation 110, a user of a client device initiates the adaptation process. For example, this can take place during an initial use or installation of the client device and secondary device. The secondary device can be a wireless communication device, such as, for example, a peripheral device, a token, a tag, a computing device, a mechanical device controlled by a wireless communication circuit, or the like. The client device can be, for example, a smart phone, a tablet, a wearable computing device or other wireless communication device.

At operation 120 the client device detects a signal from the secondary device. The signal can be broadcast according to a wireless communication standard, such as BT or BLE.

At operation 130 the client device can communicate a request to the user to place the client device at a first disposition that results in the client device detecting a signal from the secondary device at a level that is at least above a threshold level associated with the secondary device. The request can be communicated, for example, visually via a notification provided on a display or a simple LED light, audibly by a sound output from a speaker, or some other means of notification such as a communication transmitted to an tertiary device, such as a headset, a watch, a wrist band or other wearable device. The user can respond with an affirmative or negative response via an input to the client device, for example, by tapping a selection on a touch screen or pressing a physical button.

For example, the client device can instruct the user to place the client device within a default distance of the secondary device. The default distance can correspond to a distance that is determined, for example, by a manufacturer of the secondary device, designated to ensure that the client device detects a signal from the secondary device that reaches at least a default threshold strength level.

The client device can request the user to confirm communication between the client device and the secondary device in the first disposition. For example, the client device can display an identifier such as a name, model, number, icon or the like that identifies the secondary device, accompanied by a request for the user to confirm that the identified secondary device is the intended target device for the threshold adaptation. In another example, in a BT or BLE context, the user can be asked to complete a pairing process between the client device and the secondary device as confirmation.

At operation 140 the client device communicates a request to the user to place the client device in a second disposition different from the first disposition, where the second disposition results in the client device detecting the signal at a lower strength level than was detected in the first disposition. For example, the user can increase the distance between the client device and the secondary device, place the client device in a holder such as a bag, pocket, or purse, or affix an accessory, such as a protective case, additional battery pack or the like onto the client device. The client device then requests the user to reconfirm communication with the secondary device while in the second disposition.

At operation 150 the client device detects the signal strength of the secondary device when the reconfirmation is received and adjusts the threshold voltage level that is associated with the secondary device. The adjustment can be based on the detected signal strength and can provide compensation for the difference in detected signal strength between the first disposition and the second disposition.

For example, in one scenario a client device is configured to measure signal strength of a signal received from a secondary device according to a received signal strength indicator (RSSI) value or decibel (dBm) value. A default threshold associated with the secondary device can be −50 RSSI. In in an ideal disposition in which the client device is simply held up at arm's length with no accessories, the client device detects a signal strength of −50 RSSI at a distance of 10 meters from the secondary device. However, in an alternate disposition in which the client device is placed in a user's pocket, the client device does not detect a signal strength of −50 RSSI until the client device is 8 meters away from the secondary device. While at a 10 meter distance, the client device detects a signal strength of −60 RSSI. In this case, upon confirming that the client device can still identify and communicate with the secondary device at −60 RSSI, the client device can lower the threshold based on a difference in signal strength as detected at the first disposition and the second disposition. For example, the threshold can be lowered by one-half the difference between the detected signal strengths, or by a predefined incremental amount, or by another measure. By lowering the threshold in a confirmed adaptation process the client device is improved by having its functional range of communication with the secondary device increased. Furthermore the threshold can more accurately match the real world scenario that the client device will be used in.

At operation 160 the client device can fine tune the adaptation by executing operations 140-150 one or more additional times. For example, in a first disposition the client device can be held at arm's length, in a second disposition the client device can have a cover affixed to it, in a third disposition the covered client device can be placed inside a pocket, in a fourth disposition the user can take an additional step away from the secondary device, etc. Alternatively, these cycles can occur naturally during actual use of the device.

After a predetermined number cycles have concluded or after a predetermined pattern of responses from the user (e.g., the user response has entered into an oscillation pattern between two adjustments), at operation 170 the client device can automatically interact with the peripheral device based on the adjusted threshold. At this point the client device can automatically interact with the secondary device without requesting any user input. The interaction can include, for example, the client device transmitting a command to the secondary device, receiving data from the secondary device, writing data to the secondary device, causing the secondary device to execute an action, or causing the secondary device to perform a service, etc.

The disclosed threshold adaptation process 100 can therefore allow a client device to learn an adjusted threshold based on one or more dispositions which may be common contexts for the client device for this particular user. The disclosed threshold adaptation process can thereby improve the client device's wireless communication with the secondary device in multiple ways. For example, the process can result in an increased range, increased accuracy and a threshold adapted for conditions that match the actual user environment instead of being limited to a default setting.

Figure 2:
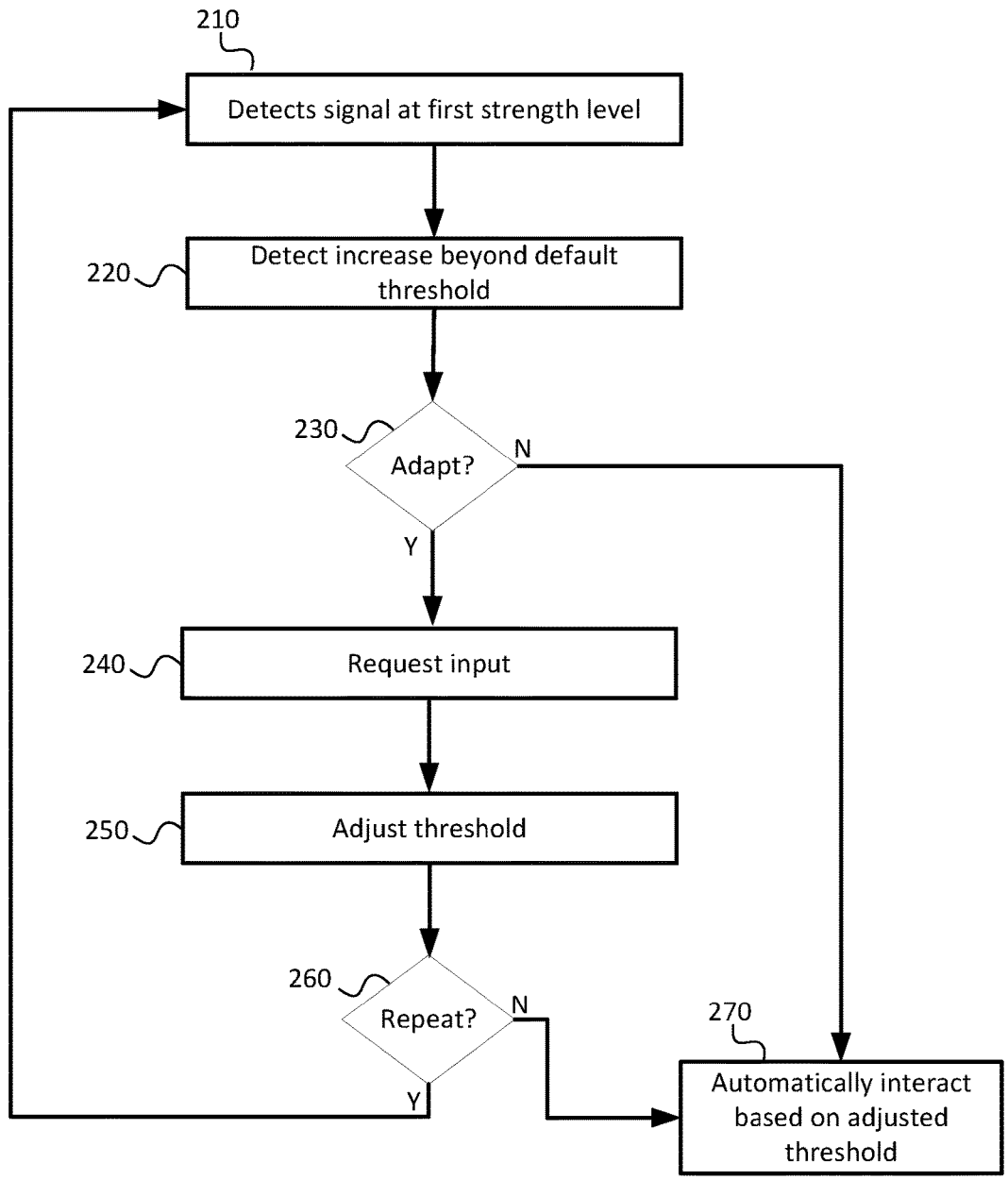
FIG. 2 shows another threshold adaptation process according to an embodiment of the disclose subject matter.

FIG. 2 shows another threshold adaptation process 200 according to a disclosed embodiment. In this embodiment the client device can improve the distance, accuracy and timing of correctly triggering an automatic communication with a secondary device in accordance with a user's intent. At operation 210 the client device detects a signal from a secondary device at a first strength level. At operation 220 the client device detects that the signal strength level has increased beyond a threshold level associated with the secondary device.

At operation 230 the client device determines whether to adapt the threshold level associated with the secondary device. If the threshold as already been adapted, the client device can proceed to operation 270 and automatically interact with the secondary device when the signal strength exceeds the adjusted threshold. If the threshold has not been adapted or is currently being adapted as will be discussed below, then the client device proceeds to operation 230.

At operation 230 the client device requests the user to input an indication of whether the client device should cause the secondary device to perform an action (e.g., turn on a light, turn on music, unlock a door, etc.). In one scenario, for example, the client device can first detect the secondary device signal at a distance of 15 meters. At that distance the detected signal strength may be −50 RSSI. The secondary device can have an associated threshold signal strength of −30 RSSI, and this association can be stored by the client device. As the user moves forward and carries the client device closer to the secondary device, the detected signal strength increases to −29 RSSI. The client device can determine that the signal strength has exceeded the threshold level associated with the secondary device. At this point the client device requests an input from the user to confirm whether the user is approaching the secondary device with the intent or expectation of the client device causing an action to be performed by the secondary device.

At operation 240 the client device can adjust the threshold level associated with the secondary device based on the user's response. For example, if the user response indicates that the user intends for the client device to cause the secondary device to perform the action, the client device can incrementally lower the threshold level. If the user response indicates that the user does not intend for the client device to cause the secondary device to perform the action, the client device can incrementally raise the threshold level. In this manner the client device can develop an action profile that increasingly corresponds to the disposition and environment of the client device and the user's cadence of approach when the user desires the action to occur.

At operation 250 the client device can determine whether to repeat operations 210-240 again the next time the secondary device signal is detected. For example, the repeated operations can conclude after a predetermined number cycles have concluded, after a predetermined patter of responses from the user, or after a command from the user. The client device can thereafter automatically transmit a signal to cause the secondary device to perform the action when the signal detected from the secondary device exceeds the adjusted threshold.

At operation 260 the client device can automatically interact with the peripheral device based on the adjusted threshold without any user input. The interaction can include, for example, the client device transmitting a command to the secondary device, receiving data from the secondary device, writing data to the secondary device, causing the secondary device to execute an action, or causing the secondary device to perform a service, etc.

In one use case, the user arrives home at night with her phone in her pocket. As she approaches her front door her phone will detect a signal from a secondary device configured to perform an action of, e.g., turning on a porch light or unlocking the door. Using an adjusted threshold determined by the disclosed threshold adaptation process her phone can accurately determine when to transmit a signal to the secondary device to cause the secondary device to perform an action.

In another use case, the client device can be a watch that the user wears. The desired action is turning on low lighting in a movie room when the user passes through the door. Through the repeated cycles of the disclosed adaptive process, the client device can learn the signal strength pattern that allows it to accurately trigger the action when the user passes through the door and not trigger the action when the user approaches the door but walks past with no intention of entering.

Thus, according to the disclosed embodiments a new threshold can be determined and/or adjusted to match a host device operational environment and user intention. For example, if a user is presenting his BLE capable phone for authentication to disarm a security system, the phone can instruct the user to perform the operation a couple of times at varying distances and derive a new threshold from the observed signals to improve the accuracy of disarming the system only when the user intends for this to occur.

In leashing use case, according to the disclosed embodiments the user could adapt threshold of signal strength that a client device detects from a leashed tag in the tag's actual use environment. Due to environmental factors the adapted threshold associated with the tag may result in a greater range of detection, an improvement which in some situations may allow the tagged object to be found when the default threshold associated with the device would have resulted in a shorter detection distance that caused the client device to miss detecting the tag or interpret the signal as noise instead of contextually understanding the signal.

Figure 3:
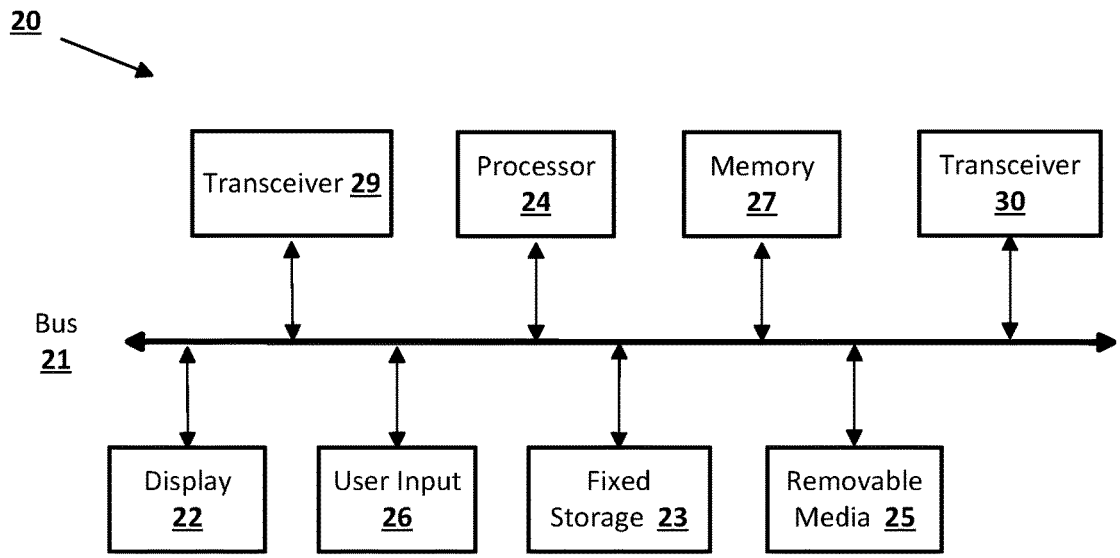
FIG. 3 shows a client device according to an embodiment of the disclosed subject matter.

Embodiments of the presently disclosed subject matter can be implemented in and used with a variety of computing devices with wireless communication capability. FIG. 3 is an example client device 20 suitable for implementing embodiments of the presently disclosed subject matter. The device 20 can be, for example, a mobile computing device such as a smart phone, tablet, or the like, a wearable computing device like a watch, wristband or the like, or a computer such as laptop, tablet, etc. The device 20 can include a bus 21 which interconnects major components, such as a central processor 24, a memory 27 such as Random Access Memory (RAM), Read Only Memory (ROM), flash RAM, or the like, a user display 22 such as a display screen, a user input interface 26, which can include one or more controllers and associated user input devices such as a button, spin wheel, slider, keyboard, mouse, touch screen, or the like, a fixed storage 23 such as a hard drive, flash storage, etc., an optional removable media component 25 operative to control and receive an memory card, optical disk, flash drive, or the like, an optional network interface 29 operable to communicate with one or more external devices via a suitable network connection, and a transceiver 30 operable to communicate with one or more secondary devices, for example according to a BT or BLE communication standard.

The bus 21 allows data communication between the central processor 24 and one or more memory components, which can include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the device 20 are generally stored on and accessed via a computer readable medium, such as a solid state storage drive (e.g., fixed storage 23), a hard drive, flash drive, optical drive, or other storage medium.

The fixed storage 23 can be integral with the device 20 or can be separate and accessed through other interfaces. The network interface 29 can also provide a direct connection to a remote server via a wired or wireless connection. The network interface 29 can provide such connection using any suitable technique and protocol as will be readily understood by one of skill in the art, including digital cellular telephone, WiFi, BT, BLE, near-field, or the like. For example, the network interface 29 can allow the computer to communicate with other computers via one or more local, wide-area, or other communication networks, as described in further detail below.

Many other devices or components (not shown) can be included and connected in a similar manner (e.g., digital cameras, speakers, microphones, scanners, etc.). Conversely, all of the components shown in FIG. 3 need not be present to in a client device 20 of the present disclosure. The components can be interconnected in different ways from that shown. The operation of a computing device such as the device 20 shown in FIG. 3 is readily known in the art and is not discussed in detail in this application. Code to implement the present disclosure can be stored in computer-readable storage media such as one or more of the memory 27, fixed storage 23, removable media 25, or on a remote storage location accessible via the network interface 29.

Figure 4:
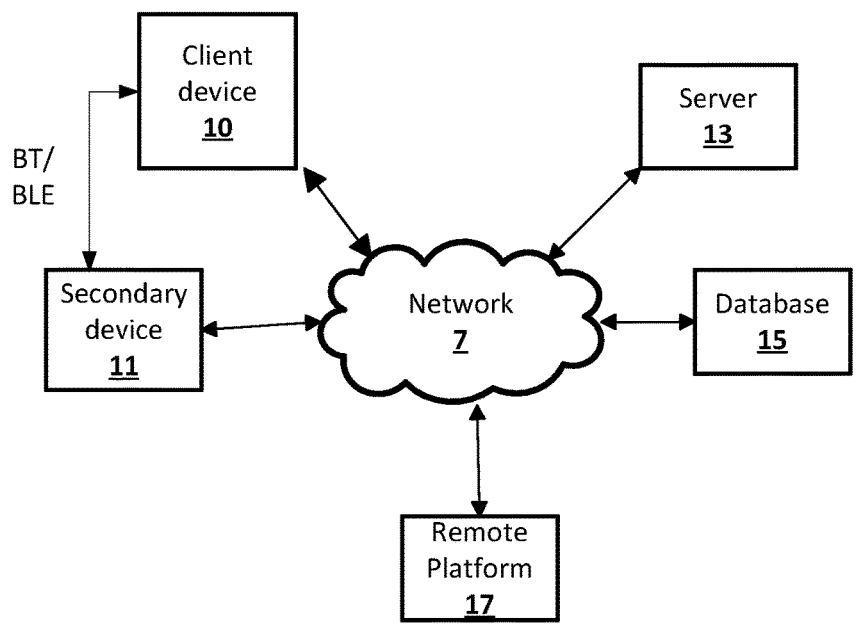
FIG. 4 shows a network configuration according to an embodiment of the disclosed subject matter.

FIG. 4 shows an example network arrangement according to an embodiment of the disclosed subject matter. A client device 10, such as a computer, smart phone, tablet computing device, and the like can connect to a secondary device 11 via a BT/BLE communication protocol and to one or more other external devices via one or more networks 7. Each device can be a computing device as previously described. The network can be a local network, wide-area network, the Internet, or any other suitable communication network or networks, and can be implemented on any suitable platform including wired and/or wireless networks. The devices can communicate with one or more remote devices, such as servers 13 and/or databases 15. The remote devices can be directly accessible by the devices 10, 11, or one or more other devices can provide intermediary access such as where a server 13 provides access to resources stored in a database 15. The devices 10, 11 also can access remote platforms 17 or services provided by remote platforms 17 such as cloud computing arrangements and services. The remote platform 17 can include one or more servers 13 and/or databases 15.

More generally, various embodiments of the presently disclosed subject matter can include or be embodied in the form of computer-implemented processes and apparatuses for practicing those processes. Embodiments also can be embodied in the form of a computer program product having computer program code containing instructions embodied in non-transitory and/or tangible media, such as memory cards, flash drives, floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also can be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Embodiments can be implemented using hardware that can include a processor, such as a general purpose microprocessor and/or an Application Specific Integrated Circuit (ASIC) that embodies all or part of the techniques according to embodiments of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of improving wireless communication of an apparatus, comprising:
   receiving, at the apparatus, an initiation request from a user;
   detecting, at the apparatus, in response to the request, a signal strength of a signal from a wireless communication device, the signal broadcasting in a wireless communication standard;
   requesting the user to place the apparatus in a first disposition in which the detected signal strength exceeds a default threshold level associated with the wireless communication device and to confirm communication between the apparatus and the wireless communication device;
   requesting the user to place the apparatus in a second disposition different from the first disposition in which the detected signal strength is less than the default threshold level associated with the wireless communication device and confirm communication between the apparatus and the wireless communication device;
   adjusting, at the apparatus, the threshold level associated with the wireless communication device based on the signal strength detected when the user confirmation is received by the apparatus; and
   automatically transmitting a signal from the apparatus to the wireless communication device to cause the wireless communication device to perform an action when the apparatus detects that the signal strength from the wireless communication device has exceeded the adjusted threshold level.

2. The method of claim 1, wherein the first disposition comprises a first location that is a first distance from the secondary device, and the second disposition is a second location that is a second distance from the secondary device that is greater than the first distance.

3. The method of claim 1, wherein the second disposition comprises the apparatus having one or more accessories disposed thereon that are absent in the first disposition.

4. The method of claim 1, wherein adjusting the detection threshold comprises lowering the detection threshold.

5. The method of claim 1, wherein the wireless communication standard comprises a Bluetooth standard.

6. The method of claim 1, wherein the wireless communication standard comprises a Bluetooth Low Energy (BLE) standard.

7. The method of claim 1, wherein the signal strength and threshold are indicated by respective Received Signal Strength Indicator (RSSI) values.

8. The method of claim 1, wherein the signal strength and threshold are indicated by respective decibel (dBm) values.

9. A method of improving a wireless communication of an apparatus, comprising:
   detecting, at the apparatus, a wireless signal from a wireless communication device at a first signal strength level;
   detecting, at the apparatus, the wireless signal increasing from the first strength level to exceed a threshold level associated with the wireless communication device;
   requesting, by the apparatus, an input from a user of the apparatus when the signal strength exceeds a threshold level associated with the wireless communication device, wherein the input indicates whether the apparatus should cause an action to occur at the wireless communication device;
   adjusting, at the apparatus, the threshold level associated with the wireless communication device after receiving the input; and
   automatically transmitting a signal from the apparatus to the wireless communication device to cause the wireless communication device to perform the action when the apparatus detects the wireless signal from the wireless communication device has exceeded the adjusted threshold level.

10. The method of claim 9, wherein adjusting the detection threshold comprises lowering the detection threshold when the input indicates that the action should be performed and increasing the threshold when the input indicates that the action should not be performed.

11. The method of claim 9, wherein the wireless communication standard comprises a Bluetooth standard.

12. The method of claim 9, wherein the wireless communication standard comprises a Bluetooth Low Energy (BLE) standard.

13. An apparatus comprising at least one processor and at least one non-transitory memory medium having computer-readable instructions stored thereon, the at least one non-transitory memory medium and the computer-readable instructions configured, with the at least one processor, to cause the apparatus to:
   receive an initiation request from a user;
   detect, in response to the request, a signal strength of a signal from a wireless communication device, the signal broadcasting in a wireless communication standard;
   request the user to place the apparatus in a first disposition in which the detected signal strength exceeds a default threshold level associated with the wireless communication device and to confirm communication between the apparatus and the wireless communication device;
   request the user to place the apparatus in a second disposition different from the first location in which the detected signal strength is less than the default threshold level associated with the wireless communication device and confirm communication between the apparatus and the wireless communication device;

adjust the threshold level associated with the wireless communication device based on the signal strength detected when the user confirmation is received by the apparatus; and automatically transmit a signal from the apparatus to the wireless communication device to cause the wireless communication device to perform an action when the apparatus detects that the signal strength from the wireless communication device has exceeded the adjusted threshold level.

14. The apparatus of claim 13, wherein the first disposition comprises a first location that is a first distance from the secondary device, and the second disposition is a second location that is a second distance from the secondary device that is greater than the first distance.

15. The apparatus of claim 13, wherein the second disposition comprises the apparatus having one or more accessories disposed thereon that are absent in the first disposition.

16. The apparatus of claim 13, wherein adjusting the detection threshold comprises lowering the detection threshold.

17. The apparatus of claim 13, wherein the wireless communication standard comprises a Bluetooth standard.

18. The apparatus of claim 13, wherein the wireless communication standard comprises a Bluetooth Low Energy (BLE) standard.

19. The apparatus of claim 13, wherein the signal strength and threshold are indicated by respective Received Signal Strength Indicator (RSSI) values.

20. The apparatus of claim 13, wherein the signal strength and threshold are indicated by respective decibel (dBm) values.

21. An apparatus comprising at least one processor and at least one non-transitory memory medium having computer-readable instructions stored thereon, the at least one non-transitory memory medium and the computer-readable instructions configured, with the at least one processor, to cause the apparatus to:

detect a wireless signal from a wireless communication device at a first signal strength level;

detect the wireless signal increasing from the first strength level to exceed a threshold level associated with the wireless communication device;

request an input from a user of the apparatus when the signal strength exceeds a threshold level associated with the wireless communication device, wherein the input indicates whether the apparatus should cause an action to occur at the wireless communication device;

adjust the threshold level associated with the wireless communication device after receiving the input; and automatically transmit a signal from the apparatus to the wireless communication device to cause the wireless communication device to perform the action when the apparatus detects the wireless signal from the wireless communication device has exceeded the adjusted threshold level.

22. The apparatus of claim 21, wherein adjusting the detection threshold comprises lowering the detection threshold when the input indicates that the action should be performed and increasing the threshold when the input indicates that the action should not be performed.

23. The apparatus of claim 21, wherein the wireless communication standard comprises a Bluetooth standard.

24. The apparatus of claim 21, wherein the wireless communication standard comprises a Bluetooth Low Energy (BLE) standard.

* * * * *